United States Patent
Manolakos et al.

(10) Patent No.: US 10,548,155 B2
(45) Date of Patent: Jan. 28, 2020

(54) SCALABLE NUMEROLOGY WITH SYMBOL BOUNDARY ALIGNMENT FOR UNIFORM AND NON-UNIFORM SYMBOL DURATION IN WIRELESS COMMUNICATION

(71) Applicant: QUALCOMM Incorporated, San Diego, CA (US)

(72) Inventors: Alexandros Manolakos, San Diego, CA (US); Jing Jiang, San Diego, CA (US); Joseph Binamira Soriaga, San Diego, CA (US); Krishna Kiran Mukkavilli, San Diego, CA (US); Peter Pui Lok Ang, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/434,133

(22) Filed: Jun. 6, 2019

(65) Prior Publication Data
US 2019/0306869 A1 Oct. 3, 2019

Related U.S. Application Data

(63) Continuation of application No. 15/458,863, filed on Mar. 14, 2017, now Pat. No. 10,356,800.
(Continued)

(51) Int. Cl.
*H04W 72/12* (2009.01)
*H04L 5/00* (2006.01)
(Continued)

(52) U.S. Cl.
CPC ....... *H04W 72/1205* (2013.01); *H04L 5/0007* (2013.01); *H04L 27/2602* (2013.01); *H04W 76/10* (2018.02)

(58) Field of Classification Search
None
See application file for complete search history.

(56) References Cited

U.S. PATENT DOCUMENTS 8,305,989 B2 11/2012 Noh et al.
2007/0064669 A1 3/2007 Classon et al.
(Continued)

FOREIGN PATENT DOCUMENTS

JP 2019516256 A 6/2019
WO 2016068072 A1 5/2016
WO 2018029988 A1 2/2018

OTHER PUBLICATIONS

Huawei et al., "Scenario & Design Criteria on Flexible Numerologies", 3GPP TSG RAN WG 1 Meeting #84bis, R1-162156, Apr. 2, 2016, XP051080002, Retrieved from the Internet: URL:http://www.3gpp.org/ftp/tsg_ran/WG1_RL1/TSGR1_84b/Docs/, 7 pages.
(Continued)

*Primary Examiner* — Edan Orgad
*Assistant Examiner* — Emmanuel K Maglo
(74) *Attorney, Agent, or Firm* — Liem T. Do

(57) ABSTRACT

Aspects of the present disclosure provide various wireless communication numerology designs that can maintain symbol boundary alignment while multiplexing different numerologies in wireless communication. The symbols may be scaled for different tone or subcarrier spacings while maintaining the symbol boundary alignment between different numerologies. Maintaining the symbol-boundary alignment between different numerologies enables symbol-level numerology multiplexing. The disclosed numerology designs enable low latency communication and improved interference management, and provide non-ambiguous symbol boundary timing reference for multiplexing different numerologies.

30 Claims, 12 Drawing Sheets

Related U.S. Application Data

(60) Provisional application No. 62/333,539, filed on May 9, 2016.

(51) Int. Cl.
   *H04L 27/26* (2006.01)
   *H04W 76/10* (2018.01)

(56) References Cited

U.S. PATENT DOCUMENTS

| | | |
|---|---|---|
| 2007/0195690 A1 | 8/2007 | Bhushan et al. |
| 2007/0195899 A1 | 8/2007 | Bhushan et al. |
| 2009/0125363 A1 | 5/2009 | Frederiksen et al. |
| 2009/0180435 A1 | 7/2009 | Sarkar et al. |
| 2010/0309775 A1 | 12/2010 | Muharemovic |
| 2012/0039221 A1 | 2/2012 | Lim et al. |
| 2013/0010641 A1 | 1/2013 | Dinan et al. |
| 2013/0010716 A1 | 1/2013 | Dinan |
| 2015/0063245 A1 | 3/2015 | Gao et al. |
| 2016/0020891 A1 | 1/2016 | Jung et al. |
| 2016/0087766 A1 | 3/2016 | Sun et al. |
| 2016/0119840 A1 | 4/2016 | Loehr et al. |
| 2016/0165622 A1 | 6/2016 | Luo et al. |
| 2016/0183302 A1 | 6/2016 | Chen et al. |
| 2016/0269135 A1 | 9/2016 | Jiang et al. |
| 2016/0294498 A1* | 10/2016 | Ma ............... H04J 11/0063 |
| 2016/0353370 A1* | 12/2016 | Choi ............. H04L 27/2613 |
| 2017/0156140 A1* | 6/2017 | Islam ............. H04L 5/0044 |
| 2017/0201968 A1* | 7/2017 | Nam ............... H04W 4/70 |
| 2017/0325250 A1 | 11/2017 | Manolakos et al. |
| 2017/0339697 A1* | 11/2017 | Park ............... H04L 5/0044 |

OTHER PUBLICATIONS

Huawei., et al., "Overview of 5G frame structure," 3rd Generation Partnership Project (3GPP); 3GPP Draft; R1-162157, Mobile Competence Centre ; 650, Route Des Lucioles ; F-06921 Sophia-Antipolis Cedex; France; vol. RAN WG1, No. Busan, Korea; Apr. 11, 2016-Apr. 15, 2016; Apr. 2, 2016 (Apr. 2, 2016), XP051080003, pp. 6. Retrieved from the Internet: URL: http://www.3gpp.org/ftp/tsg_ran/WG1_RL1/TSGR1_84b/Docs/ [retrieved on Apr. 2, 2016].

International Search Report and Written Opinion—PCT/US2017/031148—ISA/EPO—dated Nov. 10, 2017.

Mitsubishi Electric: "3rd Generation Partnership Project; Technical Specification Group Radio Access Network; Physical Layer Aspects for Evolved Universal Terrestrial Radio Access (UTRA); (Release 7)", 3GPP TR 25.814 V7.0.0, Jun. 1, 2006, XP003023401, pp. 40-44.

Partial International Search Report—PCT/US2017/031148—ISA/EPO—dated Aug. 7, 2017.

Smee J., "5G Vision and Design", IEEE 5G Summit Silicon Valley, Qualcomm Technologies, Nov. 16, 2015 (Nov. 16, 2015), XP055268339, 22 slides. Retrieved from the Internet: URL: http://www.5gsummit.org/docs/slides/John-Smee-5GSummit-SiliconValley-11162015.pdf.

* cited by examiner

SCALABLE NUMEROLOGY WITH SYMBOL BOUNDARY ALIGNMENT FOR UNIFORM AND NON-UNIFORM SYMBOL DURATION IN WIRELESS COMMUNICATION

PRIORITY CLAIM

This application is a continuation of U.S. patent application Ser. No. 15/458,863, entitled, "SCALABLE NUMEROLOGY WITH SYMBOL BOUNDARY ALIGNMENT FOR UNIFORM AND NON-UNIFORM SYMBOL DURATION IN WIRELESS COMMUNICATION," filed on Mar. 14, 2017, which claims priority to and the benefit of U.S. Provisional Patent Application No. 62/333,539, entitled, "SCALABLE NUMEROLOGY WITH SYMBOL BOUNDARY ALIGNMENT FOR UNIFORM AND NON-UNIFORM SYMBOL DURATION IN WIRELESS COMMUNICATION," filed on May 9, 2016, which are expressly incorporated by reference herein in their entirety.

TECHNICAL FIELD

The technology discussed below generally relates to wireless communication systems, and more particularly, to wireless communication numerology designs.

INTRODUCTION

Next generation radio access technology (e.g., 5G networks, New Radio (NR)) will accommodate a significant increase in data traffic and a large number of different services. Current generation radio access technology such as Long Term Evolution (LTE) may have certain operating parameters (referred to herein as "numerology") that can provide backward compatibility. However, the constraints and limitations of a single numerology may make it difficult to meet the demand (e.g., timing, latency, and/or interference management) of next generation networks. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various wireless communication numerology designs that can maintain symbol boundary alignment while multiplexing different numerologies in wireless communication. The symbols may be scaled for different tone or subcarrier spacings while maintaining the symbol boundary alignment between different numerologies. Maintaining the symbol-boundary alignment between different numerologies enables symbol-level numerology multiplexing. The disclosed numerology designs enable low latency communication and improved interference management, and provide non-ambiguous symbol boundary timing reference for multiplexing different numerologies.

One aspect of the disclosure provides a method of wireless communication at a user equipment (UE). The method includes establishing communication with a scheduling entity utilizing a first numerology having a first subcarrier spacing and a second numerology having a second subcarrier spacing. The second numerology is scaled from the first numerology such that the second subcarrier spacing of the second numerology is a positive integer multiple of the first subcarrier spacing of the first numerology. The positive integer multiple is greater than 1. A symbol length of each symbol of the first numerology is equal to a sum of symbol lengths of two or more corresponding symbols of the second numerology. A symbol of the first numerology or second numerology has a symbol length different from a symbol length of other symbols of the same numerology. The method further includes communicating with the scheduling entity utilizing a slot comprising the first numerology and the second numerology.

Another aspect of the disclosure provides a user equipment (UE) for wireless communication. The UE includes a memory stored with executable code and a processor operatively coupled with the memory. The processor is configured by the executable code to establish communication with a scheduling entity utilizing a first numerology having a first subcarrier spacing and a second numerology having a second subcarrier spacing, and communicate with the scheduling entity utilizing a slot comprising the first numerology and the second numerology. The second numerology is scaled from the first numerology such that the second subcarrier spacing of the second numerology is a positive integer multiple of the first subcarrier spacing of the first numerology. The positive integer multiple is greater than 1. A symbol length of each symbol of the first numerology is equal to a sum of symbol lengths of two or more corresponding symbols of the second numerology. A symbol of the first numerology or second numerology has a symbol length different from a symbol length of other symbols of the same numerology.

Another aspect of the disclosure provides a non-transitory computer-readable medium storing code for wireless communication at a user equipment (UE). The code comprising instructions executable to establish communication with a scheduling entity utilizing a first numerology having a first subcarrier spacing and a second numerology having a second subcarrier spacing, and communicate with the scheduling entity utilizing a slot comprising the first numerology and the second numerology. The second numerology is scaled from the first numerology such that the second subcarrier spacing of the second numerology is a positive integer multiple of the first subcarrier spacing of the first numerology. The positive integer multiple is greater than 1. A symbol length of each symbol of the first numerology is equal to a sum of symbol lengths of two or more corresponding symbols of the second numerology. A symbol of the first numerology or second numerology has a symbol length different from a symbol length of other symbols of the same numerology.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures.

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure disclose various wireless communication numerology designs that can maintain symbol boundary alignment while multiplexing different numerologies in wireless communication. In wireless communication, a numerology refers to a set of operating parameters deployed in a wireless communication system. Examples of these operating parameters include symbol duration/length, tone/subcarrier spacing, fast Fourier transform (FFT) size, frequency, slot duration, symbols per slot, cyclic prefix (CP) length, and the like. One exemplary numerology is orthogonal frequency-division multiplexing (OFDM) operating parameters that define and control how data or information may be transmitted using OFDM radio access technology. The symbols (e.g., OFDM symbols) may be scaled for different tone or subcarrier spacings while maintaining the symbol boundary alignment between different numerologies. In some examples, the symbols of a certain numerology may not have the same length. Maintaining the symbol-boundary alignment between different numerologies enables symbol-level numerology multiplexing. The disclosed numerology designs enable low latency communication and improved interference management, and provide non-ambiguous symbol boundary timing reference for multiplexing different numerologies.

Figure 1:
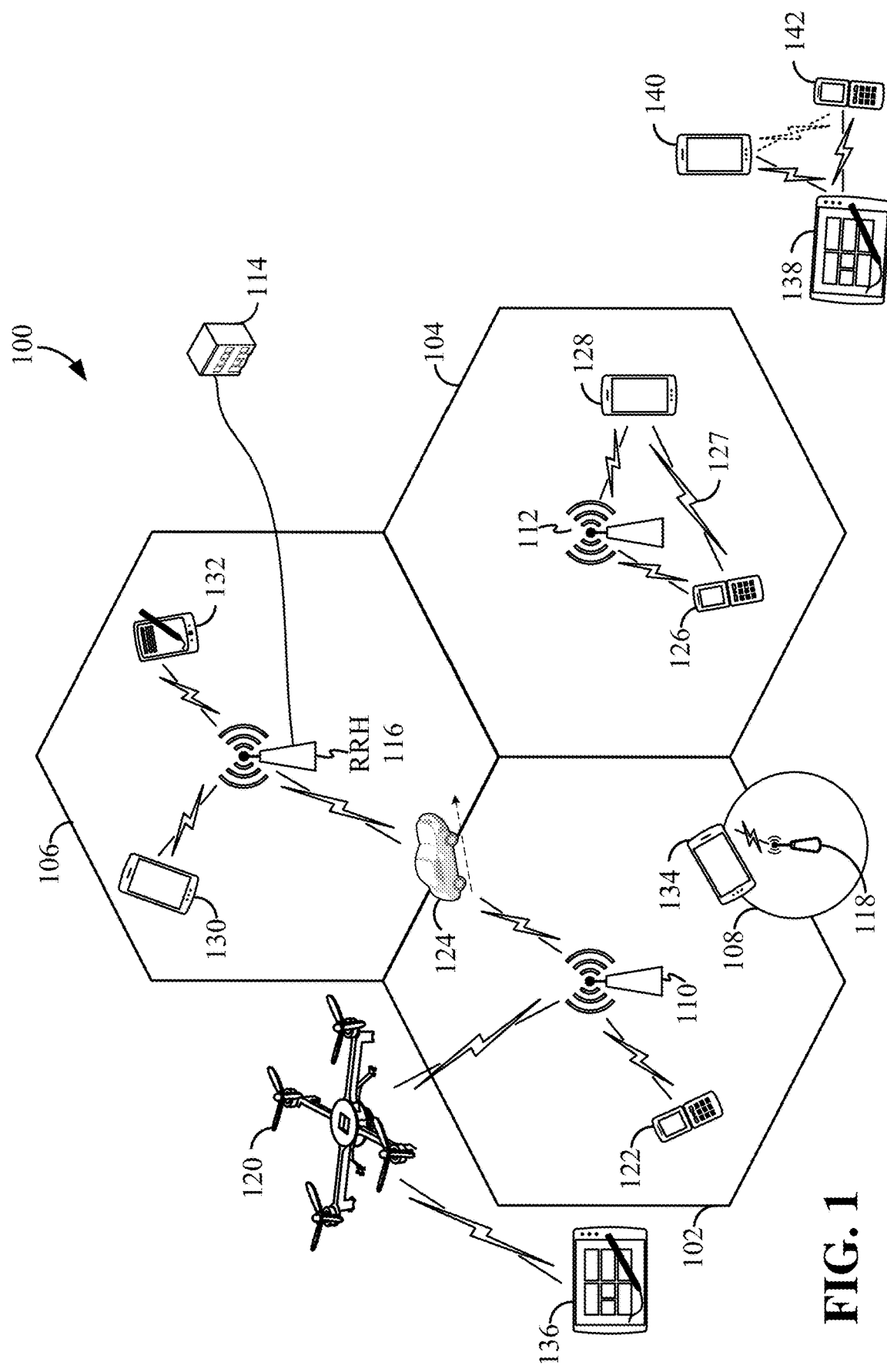
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Any of the base stations may communicate with different UEs by multiplexing different numerologies in the same slot.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1ms. Multiple subframes may be grouped together to form a single frame or radio frame.

The air interface in the radio access network 100 may utilize one or more multiplexing, multiple access algorithms, and numerologies to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell using one or more numerologies. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
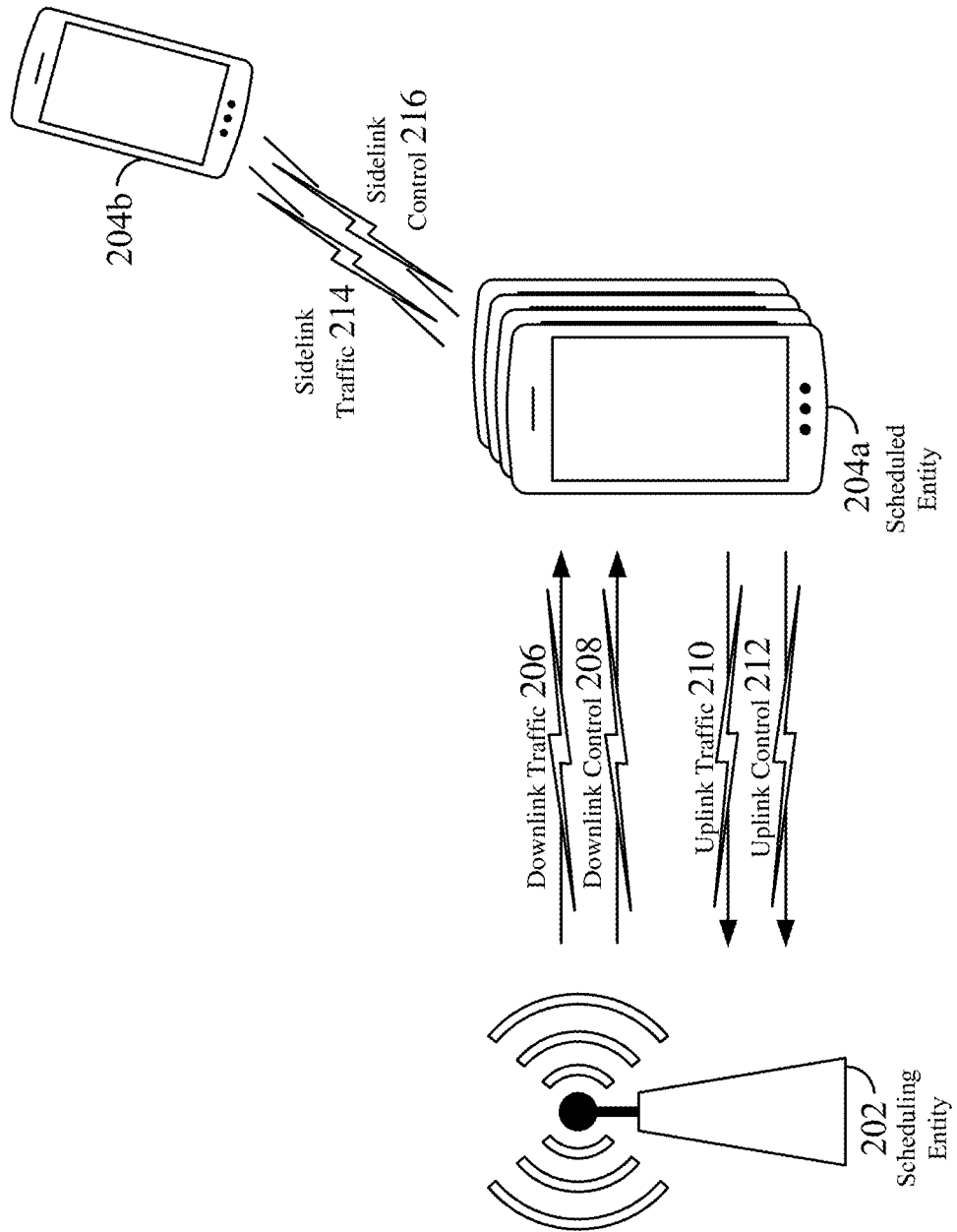
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., UE 204a and UE 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
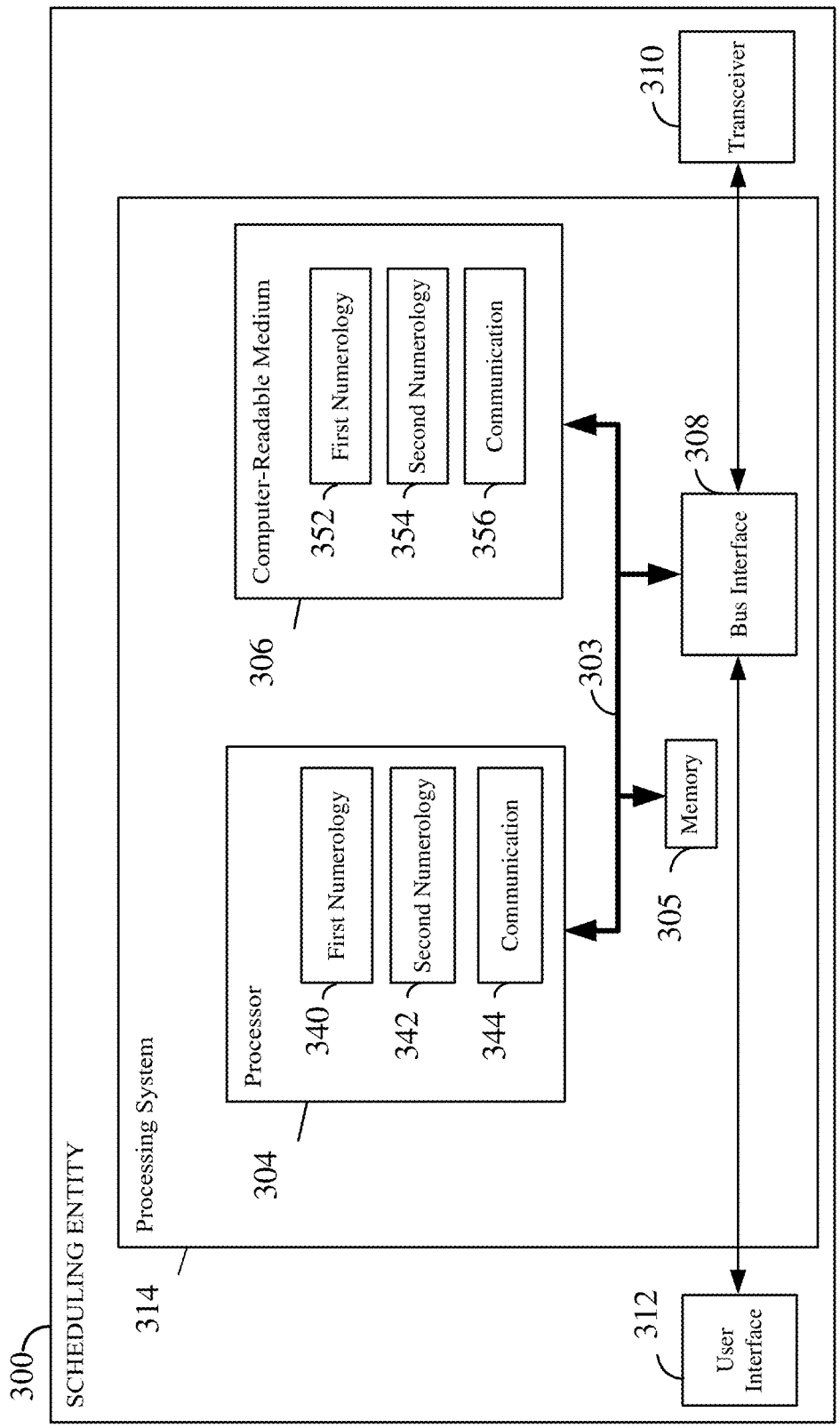
FIG. 3 is a block diagram illustrating an example of a hardware implementation for a scheduling entity employing a processing system according to one aspect of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1, 2, 5, and/or 7. In another example, the scheduling entity 300 may be a base station as illustrated in any one or more of FIGS. 1, 2, 5, and/or 7.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIGS. 6-12.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include circuitry configured to implement one or more of the functions described below in relation to FIGS. 6-12. The processor 304 may include a first numerology block 340, a second numerology block 342, and a communication block 344. The first numerology block 340 may be used to perform various functions to establish communication with a scheduled entity (e.g., UE) utilizing a first numerology (e.g., a base numerology). The second numerology block 342 may be used to perform various functions to establish communication with a scheduled entity (e.g., UE) utilizing a second numerology that may be a scaled numerology of the first or base numerology. The communication block 344 may be used to perform various functions to communicate with one or more scheduled entities by multiplexing different numerologies (e.g., base numerology and scaled numerology) in a slot.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software configured to implement one or more of the functions described in relation to FIGS. 6-12. For example, the computer-readable storage medium 306 may include first numerology code 352, second numerology code 354, and communication code 356. The first numerology code 352 may be executed to configure the processor 304 to perform various functions to establish communication with a scheduled entity utilizing a first numerology (e.g., a base numerology). The second numerology code 354 may be executed to configure the processor 304 to perform various functions to establish communication with a scheduled entity utilizing a second numerology (e.g., a scaled numerology of a base numerology). The communication code 356 may be executed to configure the processor 304 to perform various functions to communicate with one or more scheduled entities (e.g., UEs) by multiplexing different numerologies (e.g., base numerology and scaled numerology) in a slot.

Figure 4:
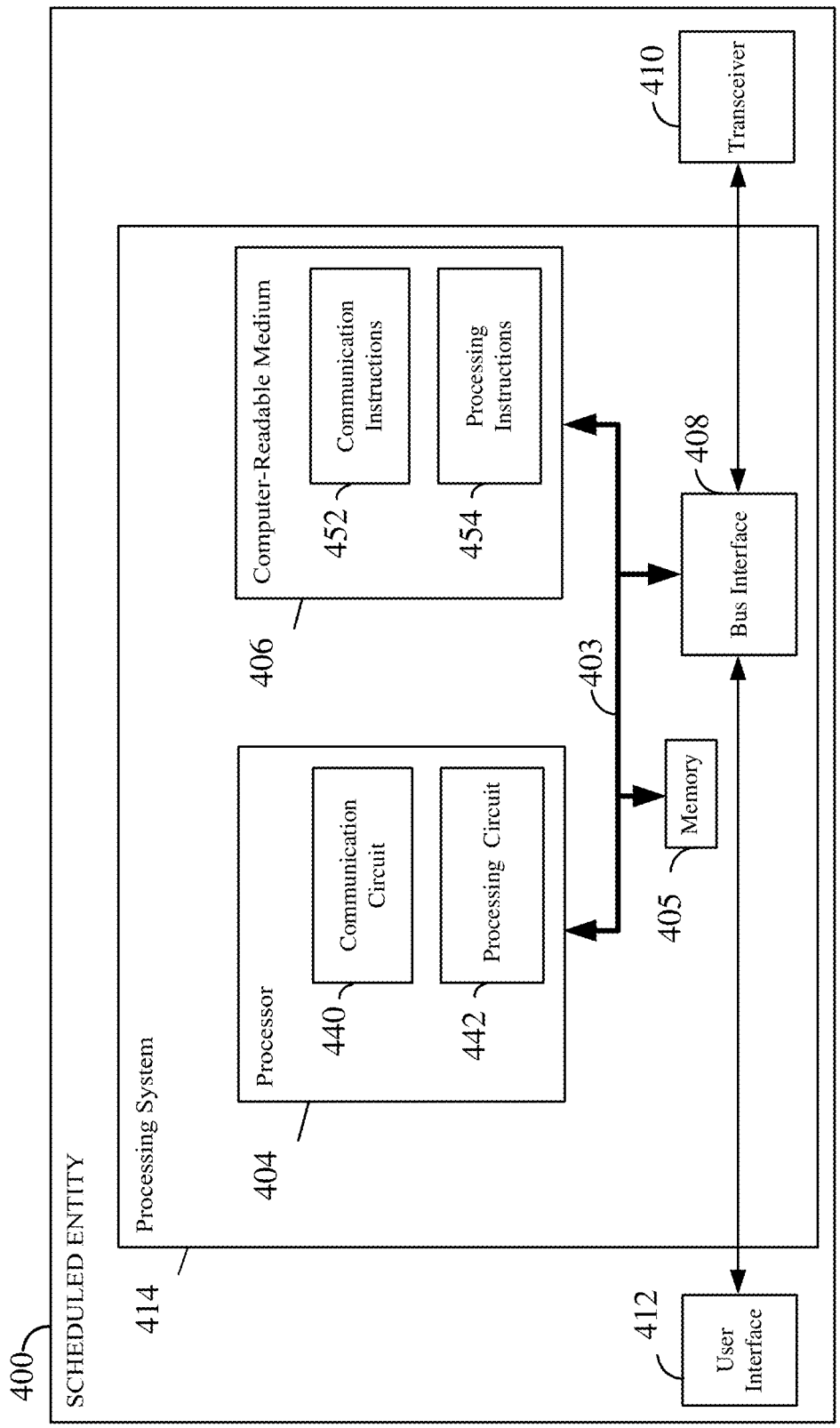
FIG. 4 is a block diagram illustrating an example of a hardware implementation for a scheduled entity employing a processing system according to one aspect of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, 5, and/or 7.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 (a communication interface) substantially similar to those described above in FIG. 3. That is, the processor 404, as utilized in a scheduled entity 400, may be used to implement any one or more of the processes described below and illustrated in FIGS. 6-12. In some aspects of the disclosure, the processor 404 may include communication circuitry 440 and processing circuitry 442 configured to implement one or more of the functions described below in relation to FIGS. 6-12. The communication circuitry 440 and processing circuitry 442 may be configured to perform the various functions described throughout this disclosure, for example, by executing communication code 452 and processing code 454 stored in the computer-readable medium 406.

Figure 5:
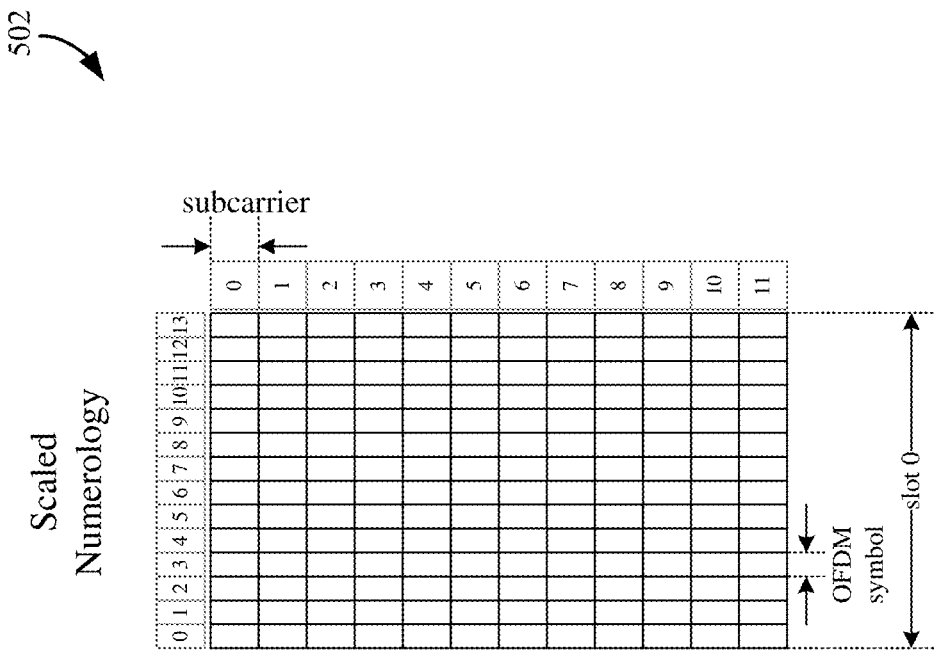
FIG. 5 is a diagram illustrating some examples of scaled numerology in wireless communication according to one aspect of the disclosure.
Figure 5:
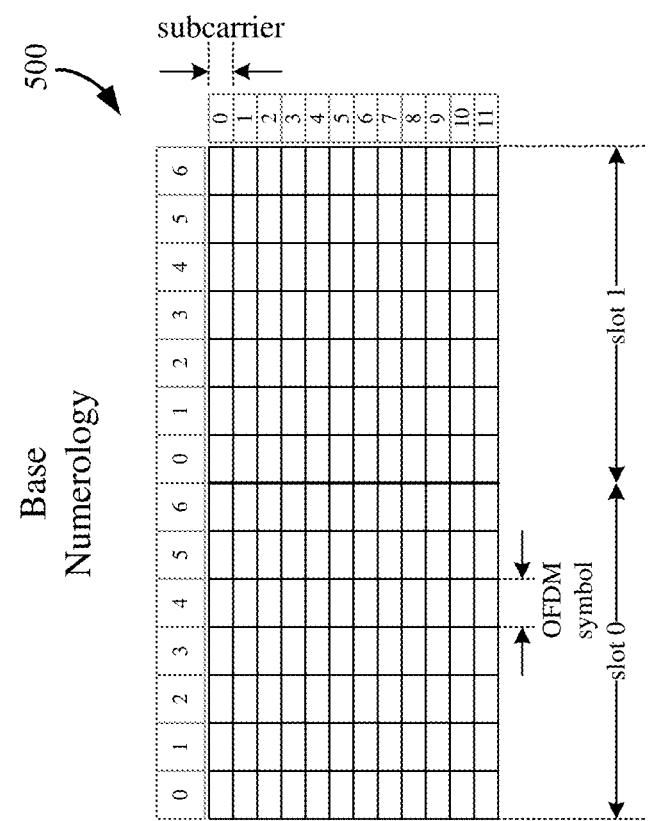

FIG. 5 is a diagram illustrating two-dimensional grids of OFDM resource elements of two numerologies according to some aspects of the disclosure. The resource elements may be arranged by separation of resources in frequency by defining a set of closely spaced frequency tones or subcarriers, and separation in time by defining a sequence of symbols having a given duration. In FIG. 5, each square box represents one resource element (RE) corresponding to an OFDM symbol and a subcarrier.

In OFDM, to maintain orthogonality of the subcarriers or tones, the subcarrier spacing is equal to the inverse of the symbol period. A scalable numerology refers to the capability of the network to select different subcarrier spacings and/or symbol periods, and accordingly, with each spacing, to select the corresponding symbol period. In general, the symbol period should be short enough that the channel does not significantly vary over each period, in order to preserve orthogonality and limit inter-subcarrier interference. On the other hand, the symbol period should not be too short. For example, in multipath environments there may be significant signal loss due to intersymbol interference because of excessive delay spread. A base numerology resource grid 500 is illustrated on the left side of FIG. 5. Each slot (e.g., slot 0 and slot 1) of the base numerology 500 has seven symbols (symbols 0 to 6). Twelve subcarriers (subcarriers 0 to 11) are available for transmitting symbols.

A scaled numerology resource grid 502 is illustrated on the right side of the FIG. 5. The resource grids 500 and 502 are not drawn to the same scale for ease of illustration. For example, slot 0 of both resource grids represents a same duration of time. Slot 1 of the scaled numerology 502 is similar to slot 0, but it is not shown in FIG. 5. In this example, a slot includes 7 symbols for the base numerology and 14 symbols for the scaled numerology. The tone spacing (subcarrier spacing) of the scaled numerology is twice as big as the base numerology. In some examples, the subcarriers of the base numerology may be different from those of the scaled numerology. In some examples, some subcarriers may be supported by both the base numerology and scaled numerology.

Figure 6:
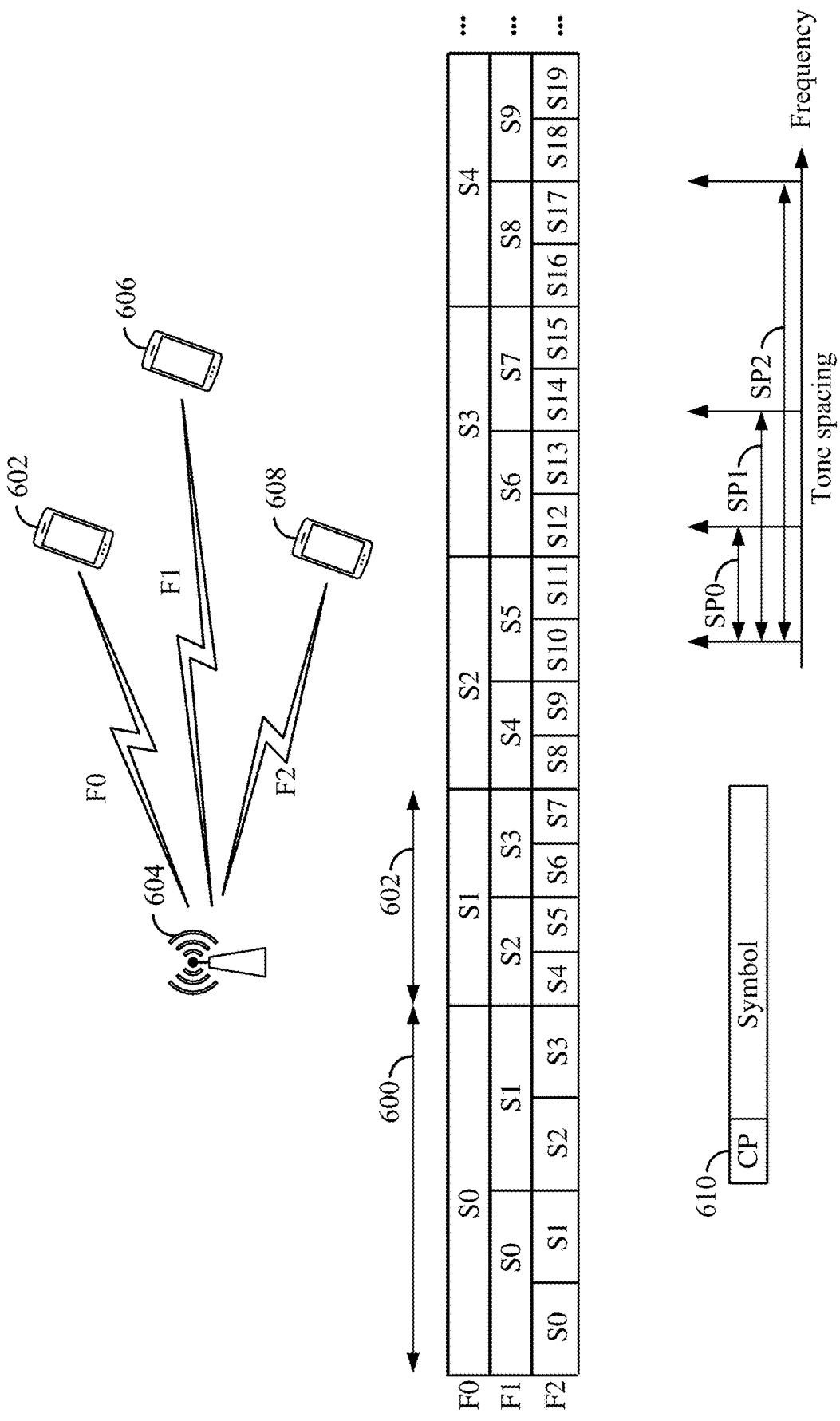
FIG. 6 is a diagram illustrating an example of frequency division multiplexing (FDM) of different numerologies and an example of time division multiplexing (TDM) of different numerologies according to some aspects of the disclosure.

FIG. 6 is a diagram illustrating some examples of scaled numerologies in wireless communication in accordance with an aspect of the disclosure. Three numerologies are multiplexed in FIG. 6. A first UE 602 may communicate with a base station 604 using a base numerology (F0), a second UE 606 may communicate with the base station 604 using a first scaled numerology (F1), and a third UE 608 may communicate with the base station 604 using a second scaled numerology (F2). The UEs of FIG. 6 may be any of the UEs illustrated in FIGS. 1-4. The base station may be any of the base stations illustrated in FIGS. 1-4. In some examples, the same UE may use different numerologies to communicate with the same base station or different base stations.

In one example, the base numerology (F0) may be similar to a numerology implemented in LTE or similar networks. A slot of the base numerology has a predetermined number of symbols. In one example, one slot may contain two half-slots, in which case each slot may have seven symbols. Out of the seven symbols, the first symbol (S0) may be longer (e.g., contain more samples) than the remaining six symbols. Five such symbols of F0 (e.g., S0 to S4) are shown in FIG. 6. Each of the symbols may have a CP (cyclic prefix) 610. In some examples, the slot may have fewer symbols, and each one has a longer CP such that an integer number of symbols span the same duration of the slot. A CP may be a copy of a tail portion of a symbol and may be placed at the front of the symbol to provide a guard time to handle multipath components from a previous symbol so as to mitigate multipath interference. In some examples, the last symbol may be longer than the other symbols of the slot. In some examples, more than one symbol may be longer than the other symbols of the slot.

The base numerology (F0) may be scaled to provide, for example, the first scaled numerology (F1) and the second scaled numerology (F2) with different subcarrier or tone spacing. To maintain orthogonality of the OFDM subcarriers or tones, the subcarrier spacing is equal to the inverse of the symbol period. A scalable numerology refers to the capability of the network to select different subcarrier spacings, and accordingly, with each spacing, to select the corresponding symbol period.

According to aspects of the present disclosure, a scaled numerology may be related to the base numerology as defined by equation (1).

$$Fs = F0 * M \qquad \text{Equation (1)}$$

In equation (1), M is a positive integer number, F0 is the subcarrier spacing of the base numerology, and Fs is the subcarrier spacing of the scaled numerology.

In this example, when the base numerology (F0) contains N symbols per time unit (e.g., millisecond), the scaled numerology (Fs) contains N multiplied by M symbols per time unit. The base numerology has a subcarrier spacing that is different from the spacing of the scaled numerology. In this example, the base numerology has a smaller subcarrier spacing SP0 than the subcarrier spacing SP1 of the first scaled numerology and the subcarrier spacing SP2 of the second scaled numerology. In this example, in a first time duration 600, the base numerology (F0) contains one symbol S0, the first scaled numerology (F1) contains two symbols (scaled by 2), and the second scaled numerology (F2) contains four symbols (scaled by 4). That is, each symbol length (including CP) of the base numerology equals to the sum of the corresponding M symbols (including CP) of the scaled numerology. For example, the symbol length of a first symbol (e.g., S0) of the base numerology (F0) is equal to the sum of two corresponding symbols (e.g., S0 and S1) of the first scaled numerology (F1), and the sum of four corresponding symbols (e.g., S0, S1, S2, and S3) of the second scaled numerology (F2). The above-described scaling is performed per symbol length, not per slot, such that the symbol boundaries of the base numerology are aligned with those of scaled numerologies. In other words, a symbol boundary of the base numerology always aligns with a boundary of a symbol of one or more scaled numerologies.

In a comparative example, symbol boundaries between different numerologies are not aligned. In this case, when a base station schedule low latency traffic for a certain UE using a certain numerology, and if the previous or ongoing symbol is of a different numerology, then the low latency traffic may need to wait for another symbol to be scheduled, thus adding extra delay. In such a case, a symbol may need to be left blank. In another non-alignment example, it may be assumed that symbol boundary of a first scaled numerology (F1) is not aligned with that of a base numerology (F0), and that a first symbol (S0) of F0 may be a bit longer than the first two symbols (S0+S1) of the first scaled numerology (F1). In this case, at the start of the third symbol (S2) of F1, the scheduling entity could not start to schedule the S2 of F1 because it needs to wait until the end of the S0 of F0. Therefore, it can be seen that without symbol alignment, scheduling of data from different multiplexed numerologies can be inefficient and may introduce extra latency due to the mismatch of symbol boundary.

In some aspects of the disclosure, each symbol may not necessarily be of the same length in a certain numerology. In one example, the first symbol may be longer than other symbols of a slot. In FIG. 6, the first symbol (e.g., S0) of the base numerology (F0) is longer than the other symbols (e.g., S1, S2, S3, S4) of the same slot, and the first two symbols (S0 and S1) of the first scaled numerology (F1) are longer than the other symbols of the same slot. Similarly, the first four symbols (S0, S1, S2, S3) of the second scaled numerology (F2) are longer than the other symbols of the same slot.

In some aspects of the disclosure, multiple CP durations per numerology may be used. For example, the symbols of the base numerology may have different CP durations, the symbols of the first scaled numerology may have different CP durations, and/or the symbols of the second scaled numerology may have different CP durations. For each CP family, each symbol length (including CP) of the base numerology equals the sum of the corresponding M symbols of the scaled numerology. The symbol-boundary alignment (at the smallest subcarrier spacing symbol level) enables symbol-level numerology multiplexing for different UEs or scheduled entities in frequency and/or time.

Figure 7:
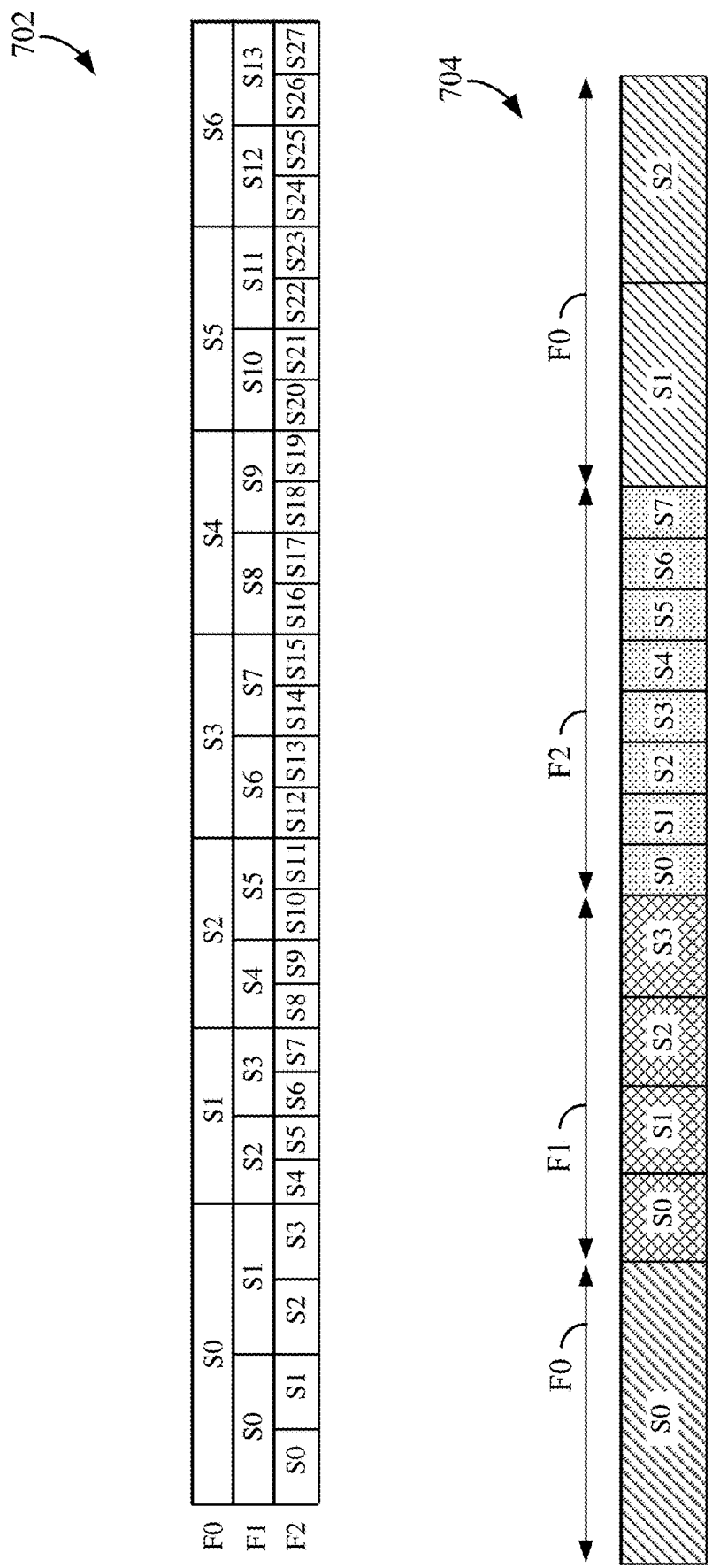
FIG. 7 is a diagram illustrating another example of scaled numerologies used in wireless communication according to an aspect of the disclosure.

FIG. 7 illustrates an example of frequency division multiplexing (FDM) 702 of UEs using different numerologies (F0, F1, and F2) and an example of time division multiplexing (TDM) 704 of UEs using different numerologies (F0, F1, and F2). In either example, the symbol boundary is aligned between different numerologies. In the TDM example, the alignment of symbol boundary between the numerologies allows the switching from one numerology to another numerology without necessary delay.

Figure 8:
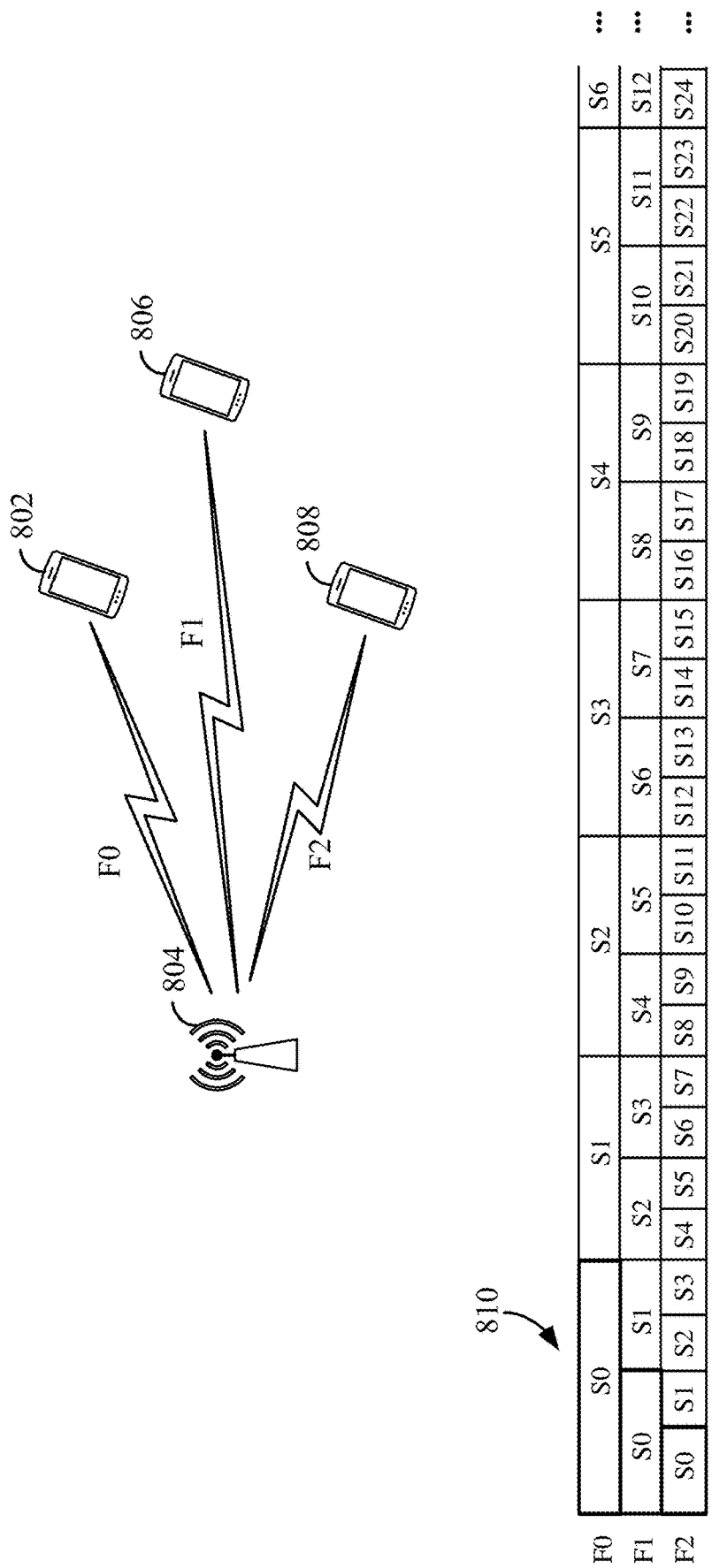
FIGS. 8 and 9 are diagrams illustrating examples of symbol boundary alignment of different numerologies for time division duplex (TDD) slots using a guard period in accordance with some aspects of the disclosure.

FIG. 8 is a diagram illustrating another example of scaled numerology multiplexing in wireless communication in accordance with an aspect of the disclosure. A first UE 802 may use a base numerology (F0) to communicate with a base station 804, a second UE 806 may use a first scaled numerology (F1) to communicate with the base station 804, a third UE 808 may use a second scaled numerology (F2) to communicate with the base station 804. The UEs 802, 806, and 808 may be any of the UEs illustrated in FIGS. 1-4. The base station 804 may be any of the base stations illustrated in FIGS. 1-4.

In this example, the non-uniformity of symbols is concentrated on the first symbols 810 in the slot, regardless of numerology used while the symbol boundaries are aligned. Referring to FIG. 8, for the base numerology (F0), only the first symbol (S0) is different in length or duration (non-uniform) from the other symbols (e.g., S1, S2, S3, S4, S5, S6) of the same slot, as it is for example the case of an LTE like numerology. The scaled numerologies F1 and F2, according to this aspect of the disclosure, also have only their first symbol (S0) longer or non-uniform in length, while the remaining symbols in the slot are uniform in duration or length.

Because only one symbol has a non-uniform length in a slot, these scaled numerologies may be simpler in various implementations and designs. In some examples, the non-uniform symbol may have a CP that is significantly longer than the CP in the remaining symbols. However, the non-uniform symbol needs not be limited to the first symbol. In some examples, the non-uniform symbol may be the last symbol of the slot.

In one example, the base numerology (F0) may have a 30 kilohertz (kHz) subcarrier spacing, an FFT size of 4096, and a slot duration of 0.5 milliseconds (ms). Therefore, there may be a total of 61440 samples within a slot. For a 14-symbol example, the first symbol duration may have 4396 samples with a CP length of 300 samples, and the duration of the remaining symbols may be 4388 samples with a CP length of 292 samples. In this example, the CP of the first symbol is longer than the CP of the other symbols by eight samples.

In one example, the first numerology (F1) may have a 60 kHz subcarrier spacing, an FFT size of 2048, and a slot duration of 0.5 ms. To maintain symbol alignment with the base numerology (F0), each symbol duration is divided by 2. Therefore, the first symbol duration may be 2202 samples (e.g., 4396 samples minus 2194 samples) with a CP length of 154 samples, and the duration of the remaining symbols may be 2194 samples with a CP length of 146 samples. In this example, the CP of the first symbol is longer than the CP of the other symbols by eight samples.

This numerology scaling method can be extended to more numerologies until the number of samples in the CP becomes an odd number because division by two of the odd CP length in samples is not possible beyond this point. In one example, the CP of the non-uniform symbol for the base numerology (F0) may be selected with the goal of being able to extend to the maximum tone or subcarrier spacing used in the wireless communication network.

In the above described scaled numerology schemes, the CP length difference in samples across symbols in the same slot may remain invariant to tone spacing given the same sampling rate (e.g., samples per symbol). For example, in the base numerology (F0), the CP for the first symbol (S0) is longer than that of the other symbols (e.g., S1, S2 . . . ) by X samples. While the first scaled numerology (F1) and second scaled numerology (F2) have wider tone spacing (short symbols), the CP for their first symbol (S0) is also longer than that of the subsequent symbols by the same amount (X samples). In one example, in all three numerologies (F0, F1, and F2), the CP of the first symbol (S0) is longer than the CP of the other symbols by the same number of samples (i.e., remain invariant).

In some examples, the percentage difference in CP between symbols may become larger for wider tone spacing. For example, the CP length difference between symbols S0 and S1 of the first scaled numerology (F1) is larger in percentage than that of the base numerology (F0). Similarly, the CP length difference between symbols S0 and S1 of the second scaled numerology (F2) is larger in percentage than that of the base numerology and first scaled numerology (F1). In these examples, the tone spacing of F2 is wider than F1, and the tone spacing of F1 is wider than F0.

In some time-division duplexing (TDD) examples, instead of making one or several CP(s) of a non-uniform symbol longer to accommodate or absorb the remaining samples (due to slot duration not precisely or evenly divisible by uniform symbol duration); if a TDD slot contains a guard period (GP), the GP may be used to accommodate, absorb, or compensate for the remaining samples due to symbol boundary mismatch. Moreover, a longer GP may provide more time for uplink-downlink switching overhead, round trip delay (RTD), etc.

Figure 9:
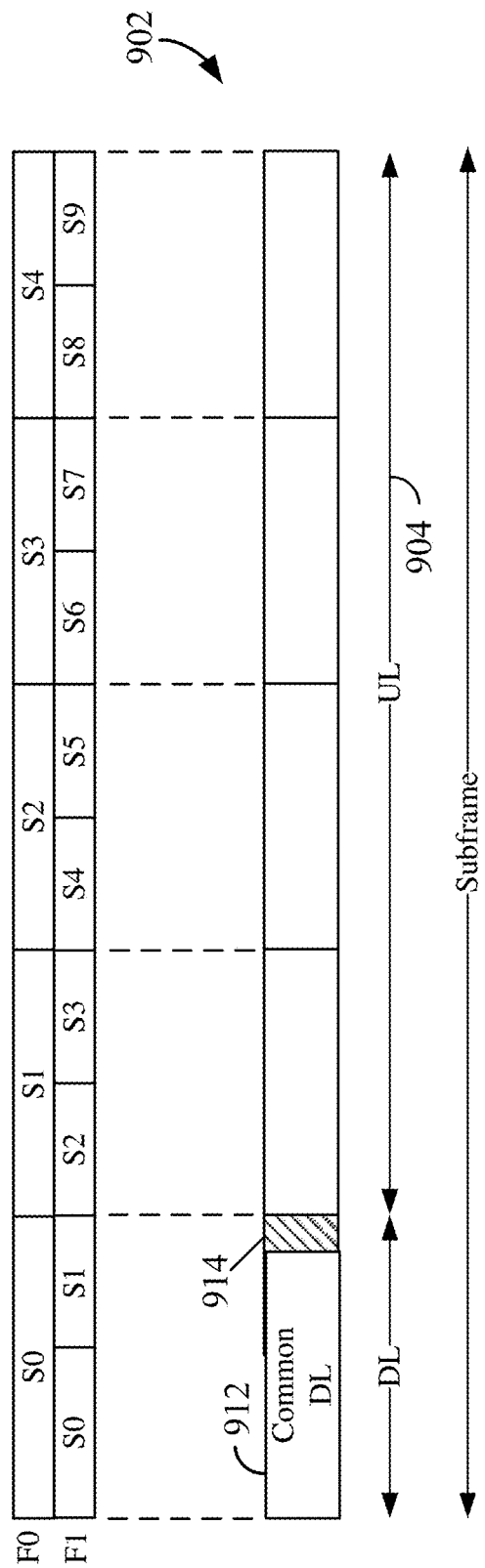
Figure 10:
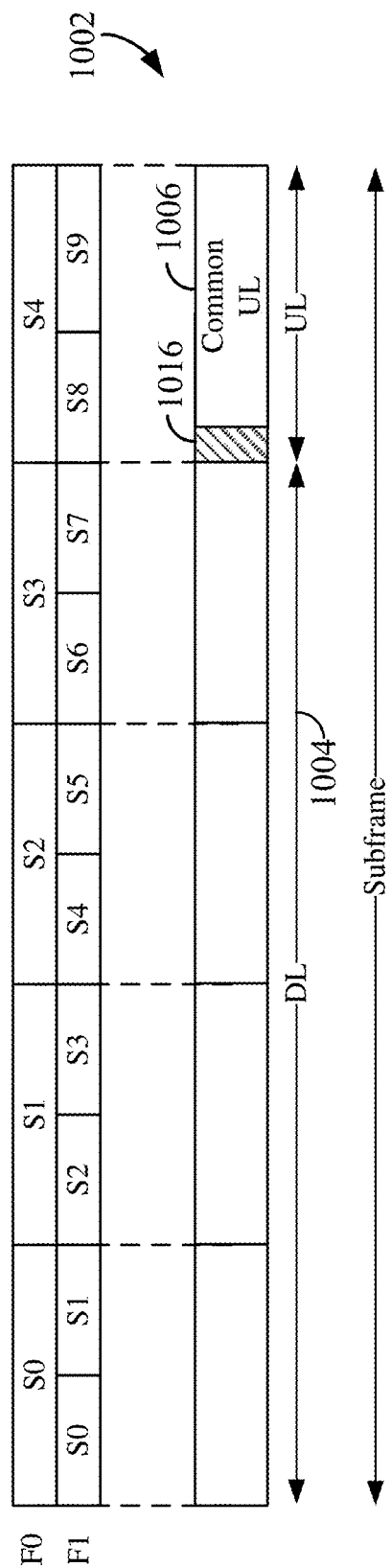
FIG. 10 is a flow chart illustrating a wireless communication method for multiplexing multiple numerologies in a slot according to some aspects of the disclosure.

FIGS. 9 and 10 are diagrams illustrating examples of symbol boundary alignment for TDD slots using a guard period in accordance with some aspects of the disclosure. A TDD slot may be a downlink (DL) centric slot or an uplink (UL) centric slot. In an UL centric slot 902, a majority of the slot may be used for transmitting UL data 904 from a scheduled entity (e.g., a UE) to a scheduling entity (e.g., a base station). Referring to FIG. 10, in a DL centric slot 1002, a majority of the slot may be used for transmitting DL data 1004 from a scheduling entity (e.g., a base station) to a scheduled entity (e.g., a UE). In some examples, the DL centric slot 1002 and UL centric slot 902 may have other fields (e.g., control data and/or channels) that are not shown in FIGS. 9 and 10.

The DL centric slot 1002 may have a common UL burst 1006 at the end of the slot for transmitting UL data. The symbol layout of the DL centric slot 1002 may have the last symbol(s) being special or non-uniform, for example, longer in length than the other symbols. In one example, symbol S4 of a base numerology (F0) is longer than the other symbols (S0, S1, S2, S3), and symbol S9 of a scaled numerology (F1) is longer than the other symbols (S0 to S8). In other examples, more than two numerologies may be multiplexed using TDD.

The UL centric slot 902 may have a common DL burst 912 at the beginning of the slot for receiving DL data. The symbol layout of the UL centric slot 902 may have the first symbol(s) being special or non-uniform, for example, longer in length than the other symbols. In this example, symbol S0 of the base numerology (F0) is longer than the other symbols, and symbol S0 of the scaled numerology (F1) is longer than the other symbols. In other examples, more than two numerologies may be used.

In one aspect of the disclosure, a guard period (GP) may be used to achieve symbol boundary alignment between the numerologies even when the slot duration is not precisely divisible by a uniform symbol duration. For example, the UL centric slot 902 has a GP 914 between the common DL portion 912 and the UL data portion 904. Similarly, the DL centric slot 1002 has a GP 1016 between the DL portion 1004 and the common UL portion 1006. In these examples, the symbols of the DL centric slot 1002 and UL centric slot 902 may have a uniform or regular length, except the first or last symbol. When multiplexing different numerologies (e.g., numerologies F0 and F1), the GP may have a different or variable length such that even though some symbols of the scaled numerology (e.g., S0 and S1 of F1) in the DL portion 912 are not aligned with those of the base numerology F0, the extra samples can be accommodated or absorbed by the GP 914. Therefore, the sum of the DL portion 912 and the GP 914 is aligned with the symbol boundary of the base numerology (F0). In this example, the TDD slot may have symbol boundary similar to that of the base numerology, and all the symbols (in the UL data portion 904) after the GP 914 are aligned with the symbol boundary of the base numerology or scaled numerology (F1). In other examples, the TDD UL-centric slot 902 may accommodate different numbers of symbols and numerologies.

Similarly, for the DL centric slot 1002, the symbols of different numerologies in the DL data portion 1004 are aligned, and the GP 1016 may be used to accommodate or absorb the symbol boundary mismatch of different numerologies in the common UL portion 1006 at the end of the slot. In this example, the GP 1016 is configured to compensate for a symbol boundary mismatch between the base numerology (F0) and scaled numerology (F1). In other examples, the TDD DL-centric slot 1002 may accommodate different numbers of symbols and numerologies.

Figure 11:
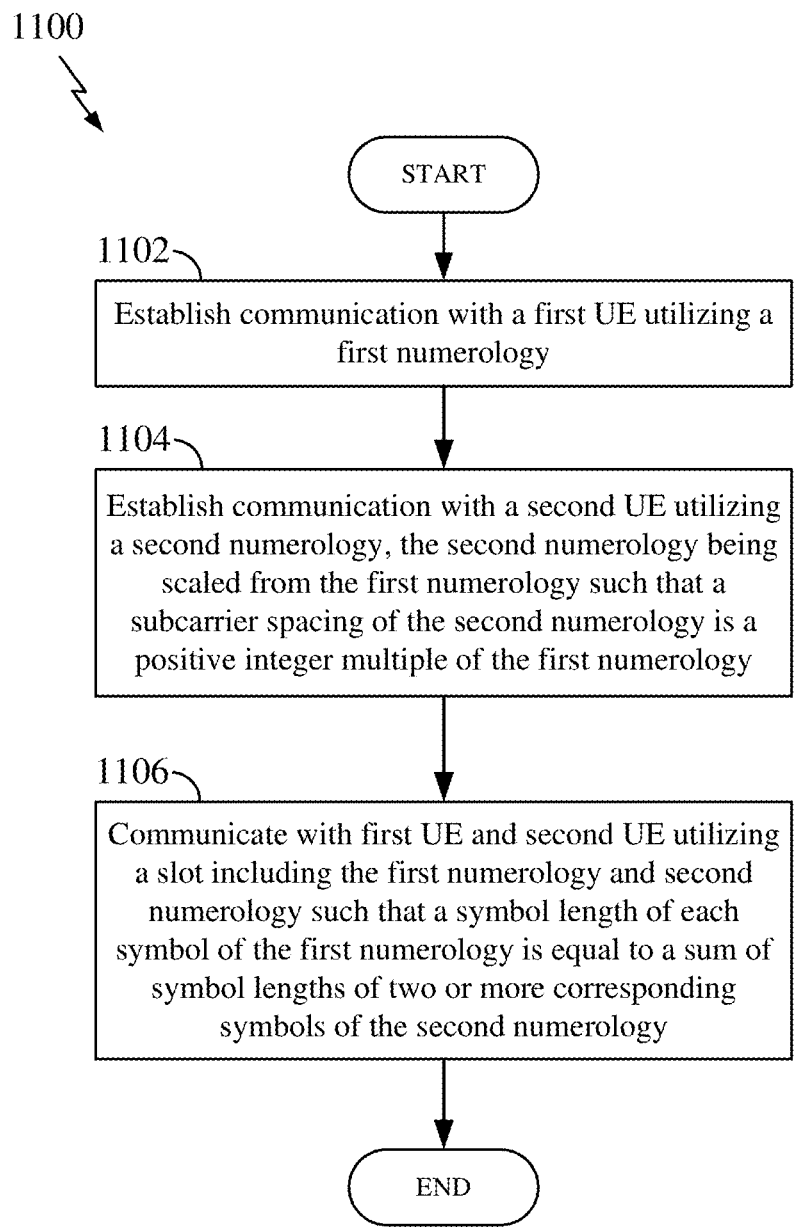
FIG. 11 is a flow chart illustrating another wireless communication method for multiplexing multiple numerologies in a slot according to some aspects of the disclosure.

FIG. 11 is a flow chart illustrating a wireless communication method 1100 for multiplexing numerologies in a slot according to some aspects of the disclosure. The communication method 1100 may be performed by any of the scheduled entities and/or scheduling entities illustrated in FIGS. 1-4, 6, and 8. In some examples, a scheduled entity may achieve symbol boundary alignment among multiple numerologies for uniform and non-uniform symbol duration using the method of FIG. 11 that is described in more detail below.

At block 1102, a scheduling entity 300 may utilize a first numerology block 340 to establish communication with a first UE utilizing a first numerology. For example, the first numerology may be a base numerology (F0) as described above in relation to FIGS. 6-10. The scheduling entity can establish communication with the first UE through exchanging one or more messages including, for example, random access messages, RRC connection establishment messages, attach and authentication messages, radio bearer setup messages, and the like.

At block 1104, the scheduling entity may utilize a second numerology block 342 to establish communication with a second UE utilizing a second numerology. The scheduling entity may utilize procedures similar to those used for the first UE to establish communication with the second UE. The second numerology may be scaled from the first numerology such that a subcarrier spacing of the second numerology is a positive integer multiple of the first numerology. For example, the second numerology may be any of the scaled numerologies (e.g., F1 and F2) as described above in relation to FIGS. 6-10.

At block 1106, the scheduling entity may utilize a communication block 344 to communicate with the first UE and second UE utilizing a slot including the first numerology and second numerology such that a symbol length of each symbol of the first numerology is equal to a sum of symbol lengths of two or more corresponding symbols of the second numerology. In some examples, the scheduling entity may multiplex the first numerology and second numerology in the slot using FDM or TDM similar to the examples illustrated in FIGS. 6-10.

In one example, the symbol boundaries of each symbol of the first numerology (e.g., S0 of F0) are aligned with symbol boundaries of two or more corresponding symbols of the second numerology (e.g., S1 and S0 of F1). In one example, a symbol of the first numerology or second numerology has a symbol length different from a symbol length of other symbols of the same numerology, and the other symbols may have a uniform length. In one example, two or more symbols of the first numerology or second numerology have same symbol length (e.g., S0 and S1 of F1 in FIG. 7) that is different from a symbol length of other symbols of the same numerology. In one example, the first numerology or second numerology uses two or more different cyclic prefix durations. That is, the symbols of the same numerology may have different cyclic prefix durations.

Figure 12:
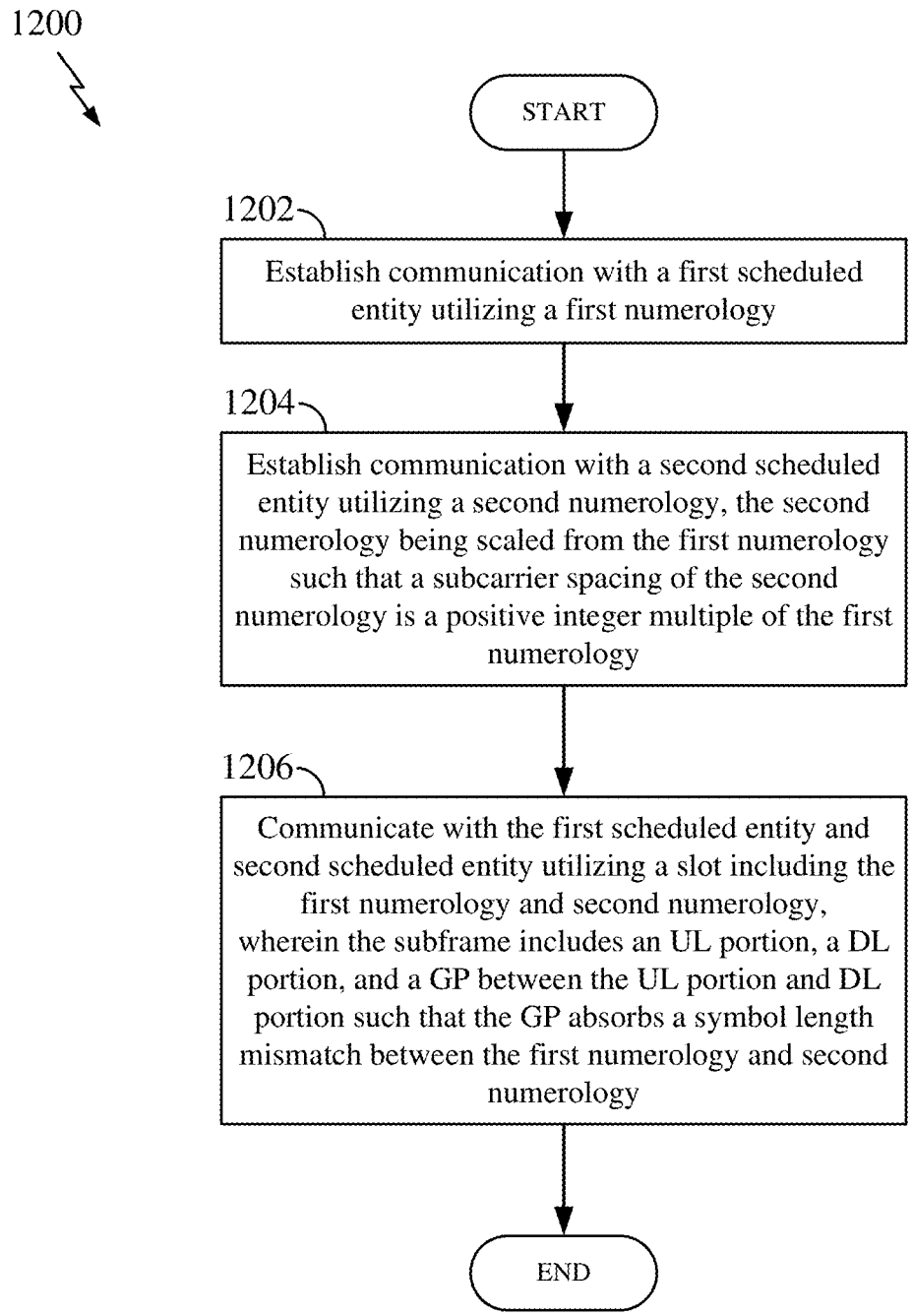
FIG. 12 is a flow chart illustrating another wireless communication method for multiplexing multiple numerologies in a slot according to some aspects of the disclosure.

FIG. 12 is a flow chart illustrating a wireless communication method 1200 for multiplexing multiple numerologies in a slot according to some aspects of the disclosure. The communication method 1200 may be performed by any of the scheduled entities and/or scheduling entities illustrated in FIGS. 1-4, 6, and 8. In some examples, a scheduled entity can achieve symbol boundary alignment among multiple numerologies for uniform and non-uniform symbol duration using the method of FIG. 12 that is described in more detail below.

At block 1202, a scheduling entity 300 may utilize a first numerology block 340 to establish communication with a first UE utilizing a first numerology. For example, the first numerology may be a base numerology (F0) as described above in relation to FIGS. 6-10. The scheduling entity can establish communication with the first UE through exchanging one or more messages including, for example, random access messages, RRC connection establishment messages, attach and authentication messages, radio bearer setup messages, and the link.

At block 1204, the scheduling entity may utilize a second numerology block 342 to establish communication with a second UE utilizing a second numerology. The scheduling entity may utilize procedures similar to those used for first UE to establish communication with the second UE. The second numerology is scaled from the first numerology such that a subcarrier spacing of the second numerology is a positive integer multiple of the first numerology. For example, the second numerology may be any of the scaled numerologies (e.g., F1 and F2) as described above in relation to FIGS. 6-10.

At block 1206, the scheduling entity may utilize a communication block 334 to communicate with the first UE and second UE utilizing a slot including the first numerology and second numerology. The slot includes an UL portion, a DL portion, and a guard period (GP) between the UL portion and DL portion such that the GP absorbs a symbol length mismatch between the first numerology and second numerology, for example, as described in relation to FIGS. 9-10 above.

In one configuration, the apparatus 300 for wireless communication includes means for performing the methods and processes as described in relation to FIGS. 6-12. In one aspect, the aforementioned means may be the processor(s) 304 in which the invention resides from FIG. 3 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIGS. 1-4, 6, and/or 8 and utilizing, for example, the processes and/or algorithms described herein in relation to FIGS. 11 and/or 12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:
    establishing communication with a scheduling entity utilizing a first numerology having a first subcarrier spacing and a second numerology having a second subcarrier spacing, the second numerology being scaled from the first numerology such that the second subcarrier spacing of the second numerology is a positive integer multiple of the first subcarrier spacing of the first numerology, the positive integer multiple being greater than 1, a symbol length of each symbol of the first numerology being equal to a sum of symbol lengths of two or more corresponding symbols of the second numerology, a symbol of the first numerology or second numerology having a symbol length different from a symbol length of other symbols of the same numerology; and
    communicating with the scheduling entity utilizing a slot comprising the first numerology and the second numerology.

2. The method of claim 1, wherein symbol boundaries of each symbol of the first numerology are substantially aligned with symbol boundaries of two or more corresponding symbols of the second numerology.

3. The method of claim 1, wherein the other symbols have a uniform length.

4. The method of claim 1, wherein two or more symbols of the first numerology or second numerology have a same symbol length that is different from a symbol length of other symbols of the same numerology.

5. The method of claim 4, wherein the other symbols have a uniform length.

6. The method of claim 4, wherein the two or more symbols are located at a beginning or an end of the slot.

7. The method of claim 1, wherein one or more symbols of the first numerology or second numerology have a symbol length longer than a symbol length of other symbols of the same numerology.

8. The method of claim 1, wherein a cyclic prefix duration difference between symbols of the first numerology is the same as a cyclic prefix duration difference between symbols of the second numerology.

9. The method of claim 1, wherein one symbol of the first numerology or second numerology has a different symbol length than all other symbols of the same numerology in the slot.

10. The method of claim 1, wherein the first numerology and the second numerology are utilized within a same carrier.

11. A user equipment (UE) for wireless communication, comprising:
a memory stored with executable code; and
a processor operatively coupled with the memory,
wherein the processor is configured by the executable code to:
establish communication with a scheduling entity utilizing a first numerology having a first subcarrier spacing and a second numerology having a second subcarrier spacing, the second numerology being scaled from the first numerology such that the second subcarrier spacing of the second numerology is a positive integer multiple of the first subcarrier spacing of the first numerology, the positive integer multiple being greater than 1, a symbol length of each symbol of the first numerology being equal to a sum of symbol lengths of two or more corresponding symbols of the second numerology, a symbol of the first numerology or second numerology having a symbol length different from a symbol length of other symbols of the same numerology; and
communicate with the scheduling entity utilizing a slot comprising the first numerology and the second numerology.

12. The UE of claim 11, wherein symbol boundaries of each symbol of the first numerology are substantially aligned with symbol boundaries of two or more corresponding symbols of the second numerology.

13. The UE of claim 11, wherein the other symbols have a uniform length.

14. The UE of claim 11, wherein two or more symbols of the first numerology or second numerology have a same symbol length that is different from a symbol length of other symbols of the same numerology.

15. The UE of claim 14, wherein the other symbols have a uniform length.

16. The UE of claim 14, wherein the two or more symbols are located at a beginning or an end of the slot.

17. The UE of claim 11, wherein one or more symbols of the first numerology or second numerology have a symbol length longer than a symbol length of other symbols of the same numerology.

18. The UE of claim 11, wherein a cyclic prefix duration difference between symbols of the first numerology is the same as a cyclic prefix duration difference between symbols of the second numerology.

19. The UE of claim 11, wherein one symbol of the first numerology or second numerology has a different symbol length than all other symbols of the same numerology in the slot.

20. The UE of claim 11, wherein the first numerology and the second numerology are utilized within a same carrier.

21. A non-transitory computer-readable medium storing code for wireless communication at a user equipment (UE), the code comprising instructions executable to:
establish communication with a scheduling entity utilizing a first numerology having a first subcarrier spacing and a second numerology having a second subcarrier spacing, the second numerology being scaled from the first numerology such that the second subcarrier spacing of the second numerology is a positive integer multiple of the first subcarrier spacing of the first numerology, the positive integer multiple being greater than 1, a symbol length of each symbol of the first numerology being equal to a sum of symbol lengths of two or more corresponding symbols of the second numerology, a symbol of the first numerology or second numerology having a symbol length different from a symbol length of other symbols of the same numerology; and
communicate with the scheduling entity utilizing a slot comprising the first numerology and the second numerology.

22. The non-transitory computer-readable medium of claim 21, wherein symbol boundaries of each symbol of the first numerology are substantially aligned with symbol boundaries of two or more corresponding symbols of the second numerology.

23. The non-transitory computer-readable medium of claim 21, wherein the other symbols have a uniform length.

24. The non-transitory computer-readable medium of claim 21, wherein two or more symbols of the first numerology or second numerology have a same symbol length that is different from a symbol length of other symbols of the same numerology.

25. The non-transitory computer-readable medium of claim 24, wherein the other symbols have a uniform length.

26. The non-transitory computer-readable medium of claim 24, wherein the two or more symbols are located at a beginning or an end of the slot.

27. The non-transitory computer-readable medium of claim 21, wherein one or more symbols of the first numerology or second numerology have a symbol length longer than a symbol length of other symbols of the same numerology.

28. The non-transitory computer-readable medium of claim 21, wherein a cyclic prefix duration difference between symbols of the first numerology is the same as a cyclic prefix duration difference between symbols of the second numerology.

29. The non-transitory computer-readable medium of claim 21, wherein one symbol of the first numerology or second numerology has a different symbol length than all other symbols of the same numerology in the slot.

30. The non-transitory computer-readable medium of claim 21, wherein the first numerology and the second numerology are utilized within a same carrier.

* * * * *